March 1, 1966  E. G. FEHER  3,237,403
SUPERCRITICAL CYCLE HEAT ENGINE
Filed March 19, 1963  5 Sheets-Sheet 1

INVENTOR.
ERNEST G. FEHER
BY
Edwin Coates
ATTORNEY

S = ENTROPY
TEMPERATURE - ENTROPY DIAGRAM FOR
THE SUPER-CRITICAL CYCLE

INVENTOR.
ERNEST G. FEHER

March 1, 1966 E. G. FEHER 3,237,403
SUPERCRITICAL CYCLE HEAT ENGINE
Filed March 19, 1963 5 Sheets-Sheet 5
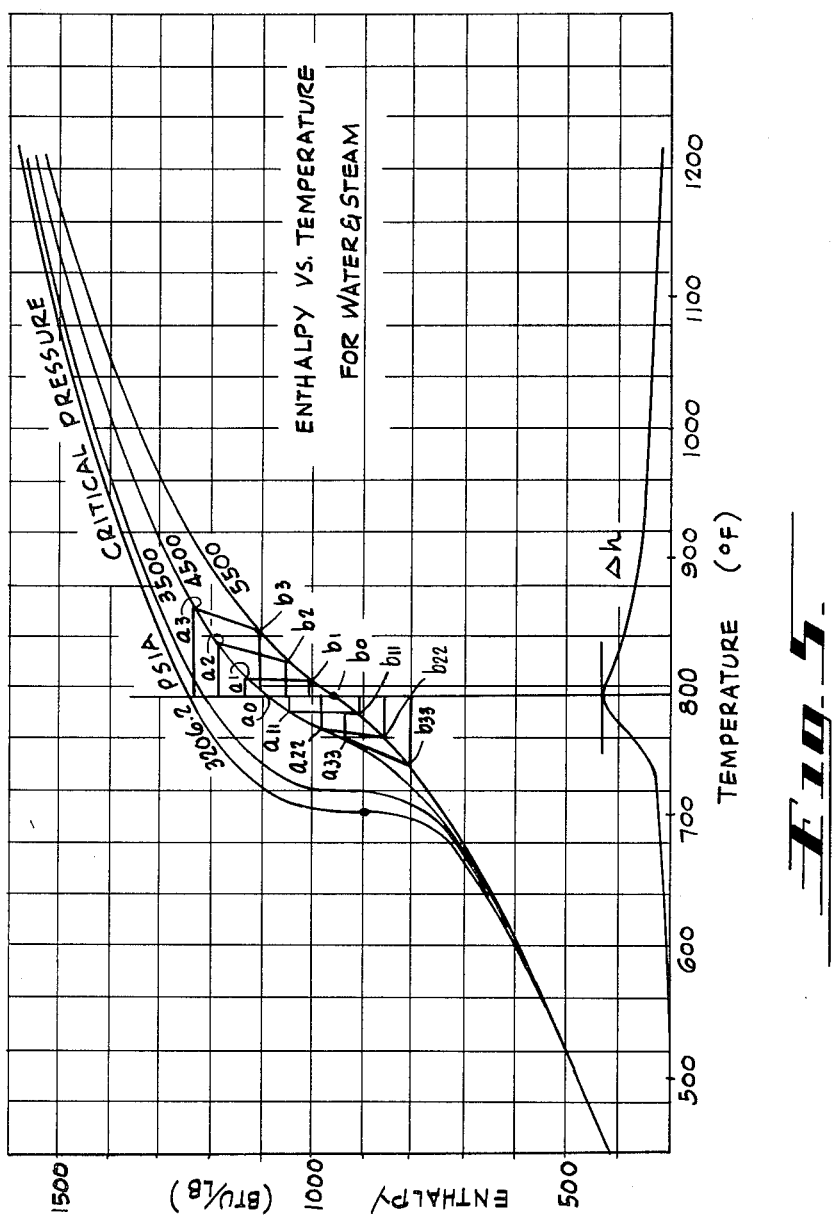
INVENTOR.
ERNEST G. FEHER
BY
Edwin Coates
-ATTORNEY- United States Patent Office 3,237,403
Patented Mar. 1, 1966

3,237,403
SUPERCRITICAL CYCLE HEAT ENGINE
Ernest G. Feher, Costa Mesa, Calif., assignor, by mesne assignments, to Douglas Aircraft Company, Inc., Santa Monica, Calif.
Filed Mar. 19, 1963, Ser. No. 266,317
18 Claims. (Cl. 60—36)

This invention relates to heat engines and more particularly to a new cycle of operation resulting in higher net work output and greater thermal and overall efficiency.

A great variety of heat engines and cycles have been suggested and tried in the past with varying degrees of success. The principal object of most of the designers has been to increase the efficiency and therefore the economy of the engines. Mechanical efficiency has been well taken care of with the many improvements in materials, bearings, and lubricants. In any event thermal efficiency is the major portion of the overall efficiency of an engine. The accepted thermodynamic criterion of thermal efficiency is the thermal efficiency of the Carnot cycle, an ideal system which is used extensively for study and comparison purposes. All engines strive to approach the Carnot efficiency as a top limit.

Several types of engines have been proposed which closely approach Carnot efficiency but have been impractical to build or operate or have been too bulky or complicated for the relatively small power output. Various other engines have been proposed which approach Carnot efficiency in theory but not in a practical way, requiring excessive numbers of heat exchangers or small pressure ratios and neglible net work output. Obviously such engines are impractical and cannot be considered as solving the problem of producing a compact, workable, useful engine with a substantial increase of efficiency and economy over conventional engines.

The present invention solves the problem in a direct, straight-forward way, providing an engine or system which requires no expensive, complicated, or unsubstantial components, but rather gains its objective by the use of a different and superior cycle. The high efficiency of the cycle is due to the facts that the pump work is a small fraction of the total work output and that most of the heat which is not used in the work output process can be transferred back to the working fluid by regeneration, thus reducing the total energy rejected from the cycle.

The new cycle can use any working fluid which is suitable for conventional engines but it is presently preferred to use pure substances such as water or carbon dioxide which have characteristics which are well known and documented and which at the same time are especially compatible with the requirements of the new cycle. Briefly and generally, in this system all processes take place at pressures substantially in excess of the critical pressures of the substances selected, and the temperature of the fluid varies from a value substantially below the critical temperature to a value substantially above the critical temperature.

As a general example a cycle begins at a point where the low cycle pressure is above the critical pressure and the temperature is below the critical temperature. Under these conditions the fluid is in a liquid state and is for practical purposes incompressible. For this reason the pump is required to do an absolute minimum of work to raise the pressure of the fluid (liquid) to the desired high cycle pressure for use in the engine. From this point the fluid is heated by regeneration from the exhaust fluid, as explained presently, and by an external source of heat such as a boiler or superheater substantially at the high cycle pressure until the desired working temperature, substantially above the critical temperature, is reached. During its passage through the regenerator and boiler or superheater it is transformed from liquid to gaseous phase without passing through a saturation phase. It is then expanded through an energy converter such as a piston engine or turbine and produces the useful work output while its pressure decreases to the low cycle pressure. Because the expansion does not follow the ideal isentropic line the fluid is at a higher temperature and enthalpy than would otherwise be the case. This is a characteristic of all practical heat engines.

The fluid is now cooled to bring it to the end of the cycle in the same condition as it started. It is first passed through the heat transmitting portion of a regenerator, the heat receiving portion of which provides part of the heating path for the compressed fluid on its way to the engine inlet. For reasons which will be more fully explained later, the fact that the heat transfer takes place at supercritical pressure in both legs of the regenerator results in a favorable relation of temperature and enthalpy between the low pressure fluid and the high pressure fluid and a maximum transfer of heat takes place, leaving a minimum amount for rejection to a heat sink.

On leaving the regenerator the fluid now passes through a cooler or condenser which extracts sufficient heat to bring it down to a temperature substantially below its critical temperature where it is again in the form of practically incompressible liquid. Because of the continuous supercritical pressure condition the fluid does not pass through the saturation phase.

Since the total work output is independent of the pump work it remains the same as it would be for any other pumping condition. However, the pump work itself has been greatly reduced to the bare minimum and hence when it is subtracted from the total work output it leaves the maximum net work output. The external heat input is minimized by the transfer of a major portion of the heat in the exhaust fluid by way of the regenerator. Since the net work output divided by the external heat input represents the thermal efficiency, the two favorable factors just mentioned result in a thermal efficiency substantially greater than that attained in present day machinery using conventional cycles.

The various mechanical components of the system are quite conventional in type but the components must be specially designed and built to operate properly under special conditions such as pressure, pressure ratio, high density of fluid passing through the turbine, and temperature and pressure limits in the regenerator, boiler, condenser, etc. The increased efficiency, aided by the high average density of the fluid, results in a smaller, lighter, and more compact assembly for the same available power output. This in turn means a further saving in cost and space requirements.

Other advantages and features of novelty will become apparent as the description proceeds in conjunction with the accompanying drawings in which:

FIG. 5 is a similar diagram using higher selected cycle pressures.

Figure 1:
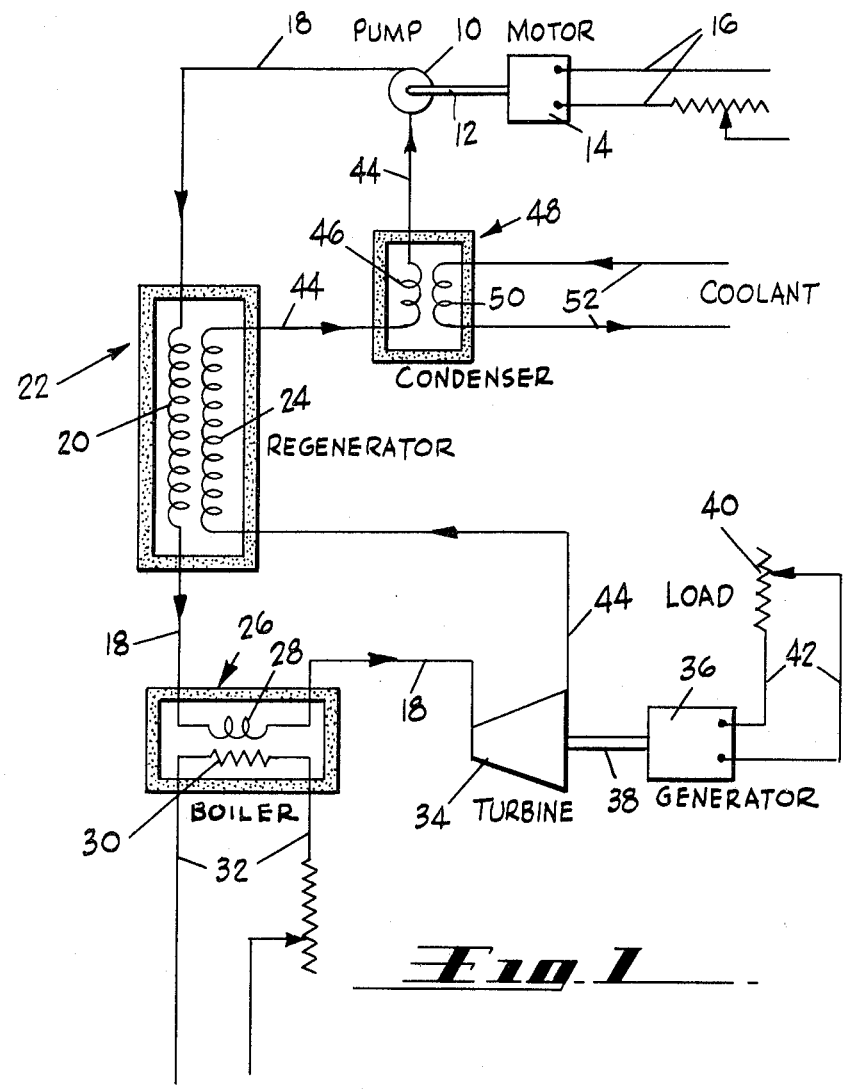
FIG. 1 is a schematic illustration of a heat engine system in which the invention is utilized.

The schematic illustration in FIG. 1 represents a complete engine or circulating system using specially designed components adapted for the practice of the invention. The system includes a pump 10 driven through shaft 12 by a motor 14 which receives energy from an electrical supply, not shown, through conductors 16. The pump compresses or pressurizes fluid (liquid) to a high cycle pressure level and delivers it to conduit 18 through which it passes to element 20 of regenerator 22. In this element it receives heat from element 24 and then continues on to boiler or superheater 26 where it passes through element 28 arranged in heat exchange relation with a heating element, here shown as a resistance heater 30 supplied from a source, not shown, with electric current through conductors 32. It is to be understood that any type of heat supply may be used.

The heated fluid now continues through conduit 18 to a turbine 34, or other suitable engine, and is expanded to do useful work and to reduce it to a low cycle pressure level. The turbine drives a generator 36 through shaft 38, and a load 40 is connected to the generator by conductors 42 to do useful work.

When the expanded but still very hot fluid leaves the turbine it passes through conduit 44 to the heat transmitting element 24 of the regenerator, and the major portion of its heat is delivered to the fluid passing through receiver element 20. The fluid then continues to hot element 46 of cooler or condenser 48 where it gives up additional heat to cold element 50 connected by conduits 52 to a coolant source, not shown, which can be the atmosphere, a body of water, or any suitable heat sink. The fluid in its cooled condition now passes in liquid phase through conduit 44 to the pump, completing a cycle and being ready to begin the next one. In the heating process the change from liquid to gaseous phase may take place in either the regenerator or the boiler or superheater, and in the cooling process the change from gaseous to liquid phase may take place in the regenerator or the cooler or condenser. The place of change depends on the working fluid used and on the upper and lower temperature limits of operation.

The specific types of components shown are for illustrative purposes only. The system will work in the same way with any type of fluid motor and any type of heat source and heat sink, and drive any type of load including the pump, which may be directly mechanically connected to the motor.

Figure 2:
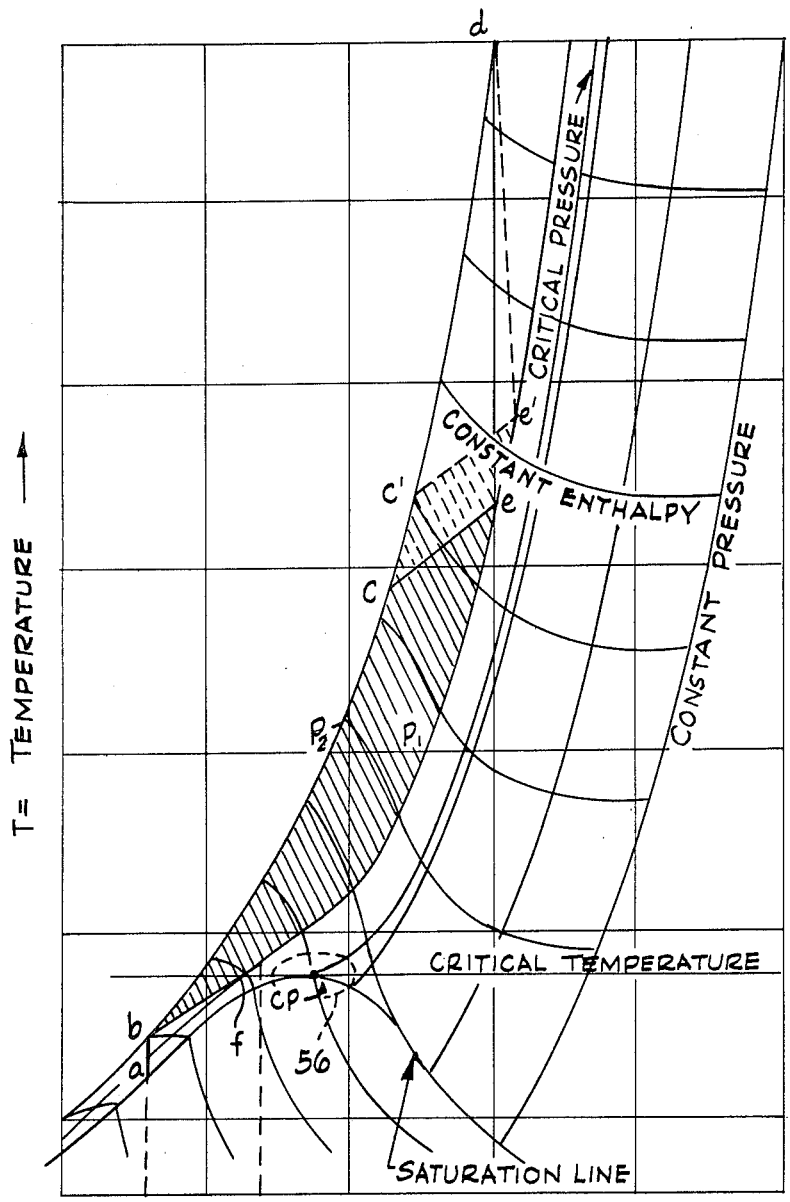
FIG. 2 is a temperature-entropy diagram illustrating the processes of the new cycle.
Figure 3:
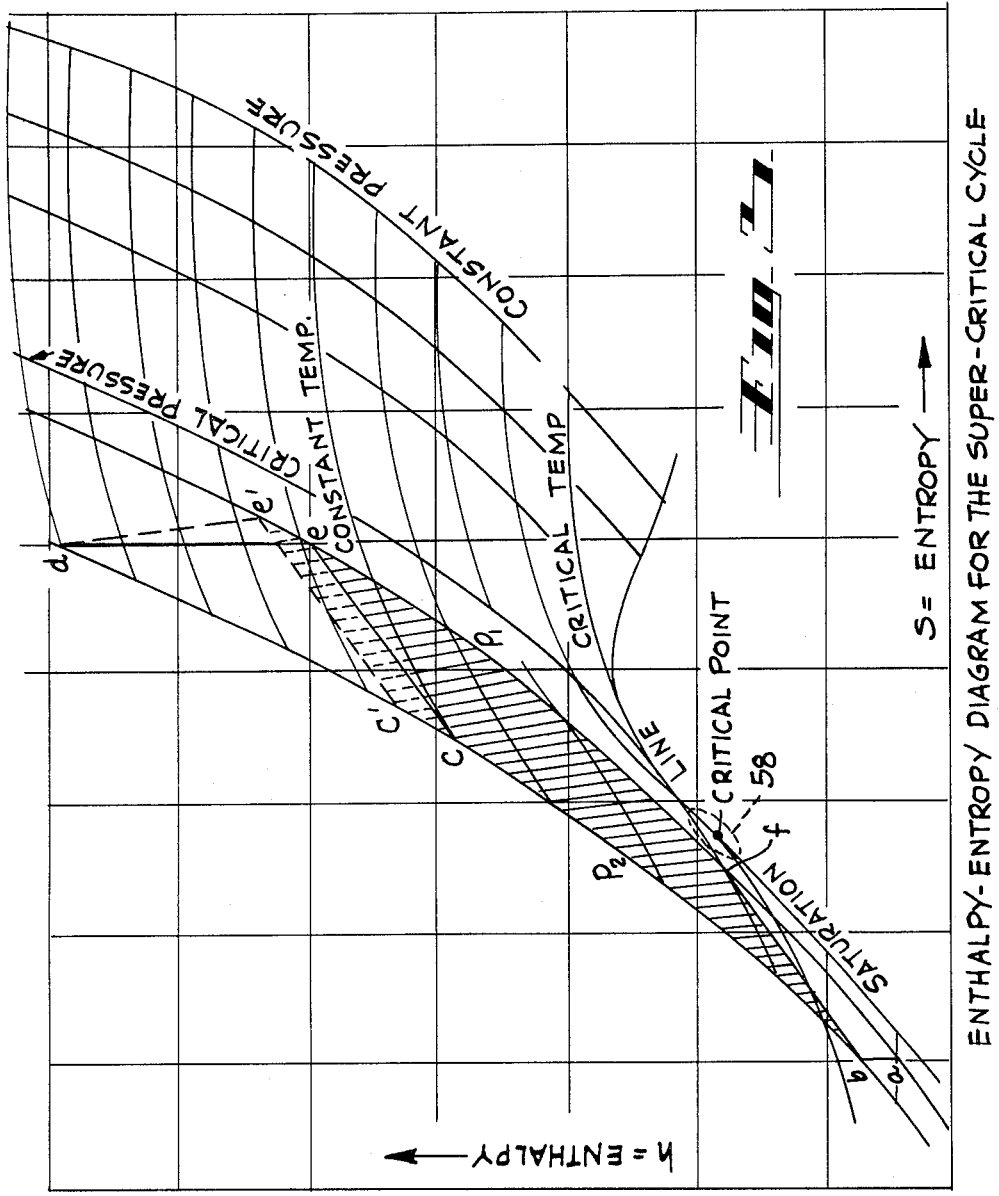
FIG. 3 is an enthalpy-entropy diagram also illustrating the processes of the new cycle.

Turning now to FIGS. 2 and 3 it will be seen that these are standard thermodynamic charts on which the new cycle has been superimposed to illustrate its characteristics, functions, and advantages. The solid lines indicate ideal conditions and the dotted lines indicate the departures from ideal conditions which are normally to be expected. The points on the charts will be related to the various mechanical elements shown in FIG. 1.

The ideal cycle begins at point $a$. It will be noted that the temperature at this point is substantially below the critical temperature, represented in each chart by a line passing through the Critical Point. At the same time this point $a$ is substantially above the critical pressure which is also represented in each chart by a line passing through the Critical Point. Under these conditions the fluid is entirely in liquid form and practically incompressible except at extremely elevated pressure conditions. This is the fluid which enters pump 10 and is compressed or pressurized in its liquid phase by the pump from its low cycle pressure to its high cycle pressure at constant entropy, bringing it up to point $b$. Since it is a liquid, the pump has done the minimum possible work in raising its pressure.

The fluid is now passed on to regenerator 22 where heat is added from the exhaust fluid line. The temperature change takes place along supercritical constant pressure line $bc$, and as the temperature crosses the critical temperature line the fluid is transformed from the liquid to the gaseous phase. At point $c$ the fluid has adsorbed all the heat which can be delivered from the exhaust fluid in the regenerator and passes to the boiler or superheater where external heat is added by means 30. This heat addition takes place along line $cd$ which is also part of the constant pressure line representing the high cycle pressure of the system. At point $d$ the fluid is at its highest temperature and pressure and is now ready to perform useful work.

The fluid now enters turbine 34 and is allowed to expand at constant entropy down to the low cycle pressure at point $e$. The expansion produces useful work, or total work output, in the form of electricity generated by generator 36 and passed on to load 40, or in any other form. Point $e$ is at the same supercritical pressure as point $a$ and represents the end of the third process in the cycle.

In order to bring the fluid back to the pump in its original condition and to complete the cycle it is necessary to remove a substantial quantity of heat. It is essential for maximum thermal efficiency to transfer as much heat as possible from the exhaust line to the supply line, so that the minimum quantity will be rejected. The fluid is therefore routed from the turbine to the regenerator 22 where it gives up heat in the transmitting element 24, which heat is transferred to the supply fluid passing through receiving element 20. The heat exchange takes place entirely at supercritical pressure in both elements of the regenerator and accomplishes the maximum heat transfer for reasons which will be more fully explained hereinafter. The cooling is represented by line $ef$ which is a part of the supercritical low cycle pressure line.

At $f$ the fluid is transferred to element 46 of cooler or condenser 48 and gives up more heat to element 50 which is connected to an external coolant or heat sink. This heat, of course, is rejected and permanently lost to the system. This stage of the cooling occurs along the same low cycle pressure line as the portion $ef$ and brings the temperature down to the temperature at $a$. In the cooling process the temperature crosses the critical temperature line and the fluid is transformed from its gaseous to its liquid phase. On leaving the cooler or condenser the fluid passes in liquid phase to the pump 10 at point $a$. This completes the cycle and the fluid is ready to begin another cycle. As mentioned above, the change of phase of the working fluid may take place in any of the heating or cooling components.

It is not practical to build heat engine systems so that compression and expansion can occur exactly along isentropic lines because of design difficulty, complication, and cost. In the present cycle the departure from isentropic compression is so slight that it cannot be shown in the charts of FIGS. 2 and 3. The departure in the expansion process is more noticeable and is represented by the line $de'$. The process is irreversible and the total work output is less than ideal, the situation being typical of present day cycles as well as the new cycle. The loss of useful work is the enthalpy difference $E_1$ represented by the line $ee'$. Because of the regenerator most of this enthalpy difference $E_2$ can be transferred to the heat input process where it appears as $cc'$, reducing the required external heat input so that the actual thermal efficiency is only slightly changed from the ideal and can be represented as $$\eta_{at} = \frac{(\Delta H_W - E_1) - \Delta H_P}{\Delta H_Q - E_2}$$

In the heating process and the cooling process there is also a typical departure from ideal conditions so that the pressure gradually drops below line $bd$ in the heating process and below line $e'a$ in the cooling process, however the difference is so slight that the lines would appear to coincide in FIGS. 2 and 3, and the non-ideal lines have not been shown. Hence it can be said that these processes occur substantially along the constant pressure lines.

The high efficiency of the new cycle is due to the fact that the pump work is such a small fraction of the total work output and the further fact that the major portion of the heat remaining in the fluid exhausted from the energy converter can be transferred back to the working fluid by the high efficiency regenerator, thus reducing the total energy rejected from the cycle. At the critical point there is a substantial "gray" area indicated in dotted lines at 56 in FIG. 2 and 58 in FIG. 3, where the substance of the working fluid is quite "mushy" or elastic, and its action is less predictable than in clearly defined zones. If any process or part of a process takes place in this area it will be subject to latent heat problems to some extent as well as to the problem of elasticity or compressibility of fluid.

It has been proposed in the past to carry the cooling process down to the critical point on or close to the critical pressure line and to begin pumping or compressing from there. Such a process is relatively inefficient because it involves pumping of a highly elastic fluid. It can be seen by a glance at the charts that the pump work in such case is a large proportion of the total work output, and when it is subtracted therefrom the net work output and efficiency are poor. In addition, slight deviations from programmed operations can bring the processes down into the saturation zone with further loss of efficiency.

On the contrary, the new cycle is operated so that the cooling process occurs along a constant low cycle pressure line which is substantially above the critical pressure and completely avoids any area adjacent the saturation zone which would cause the difficulties mentioned above. In addition, the cooling is carried down to a point substantially below the critical temperature so that the fluid is completely liquefied. Because the pump handles only incompressible liquid the pump work is very small. The charts show that the pump work $ab$ is a very small proportion of the total work output $de$ and hence effectively decreases it only slightly, leaving a net work output far gerater than has been obtainable previously.

The all important regeneration process in the supercritical cycle requires close scrutiny because of its marked effect on cycle efficiency and because of the pecularity of the pure substance that its specific heat at constant pressure becomes infinite at the critical point. By definition, the specific heat at constant pressure is the ratio of increase in enthalpy in a constant pressure process to the corresponding increase in temperature, expressed as a derivative. Symbolically:

$$C_p = \left(\frac{\partial h}{\partial t}\right)_p$$

Figure 4:
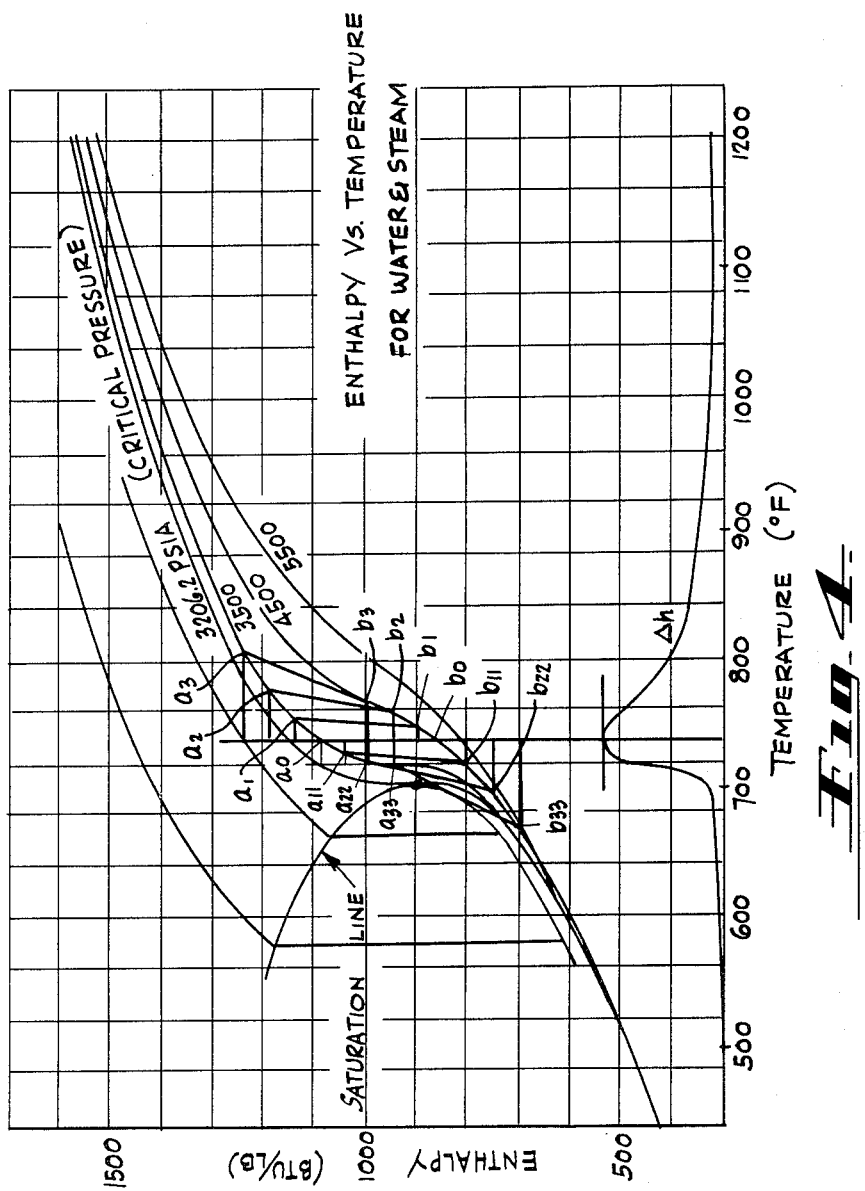
FIG. 4 is an enthalpy-temperature diagram for water and steam illustrating the heat flow characteristics between two selected cycle pressures which account for the effectiveness of the regenerator.

If the properties of a pure substance are represented on a rectangular coordinate system, with enthalpy as the ordinate, temperature as the abscissa, and lines of constant pressure are drawn, then tangents to these lines represent the specific heat at constant pressure at the point of tangency. The slope of the tangent is the value of the specific heat. FIG. 4 shows such a set of curves for water. All usable fluids have similar curves and the following explanation is valid for all of them. On the critical pressure line the maximum slope occurs at the critical point. The slope is infinite and so is the value of the specific heat. At higher pressures, the maximum slope is finite. The higher the pressure, the lower the value of the maximum slope.

To illustrate the effect of the pressure level and pressure ratio on the regenerator, and using water for the example, assume the lower and upper pressures of a supercritical cycle to be 3500 p.s.i.a. and 4500 p.s.i.a., respectively. Using FIG. 4, the enthalpy difference at constant temperature for these pressures is plotted as a function of temperature and labeled $\Delta h$. The constant temperature line at the maximum point of the $\Delta h$ curve is drawn. This reference line intersects the 3500 p.s.i.a. and 4500 p.s.i.a. constant pressure lines at $a_0$ and $b_0$, respectively. Now, equal increments of enthalpy are laid off on the two pressure lines in the direction of both increasing and decreasing enthalpy, and the corresponding points are connected, such as $a_1$, $b_1$, $a_{11}$, $b_{11}$, $a_2$, $b_2$, $a_{22}$, $b_{22}$, etc. to produce a series of temperature gradient lines of varying slope. The steeper the slope the less temperature difference is available to accomplish heat exchange. If the slope reverses, or angles the other way, the temperature gradient is reversed and heat will flow in the wrong direction.

For each enthalpy change there is a corresponding temperature change. For each uniform increment of enthalpy increase from the value at the reference line there is a greater temperature-increase (to the right) increment on the lower pressure line than on the higher pressure line. Conversely, for each uniform increment of enthalpy decrease from the value at the reference line there is a greater temperature-decrease (to the left) increment on the higher pressure line than on the lower pressure line. The result of this is that there is a favorable positive temperature gradient at every point except the temperature at maximum $\Delta h$, and a positive gradient at this point can be accomplished by proper selection of the starting and finishing temperatures. Thus there is no point in the range of the regenerator where the temperature gradient is reversed, and the temperature differential is not excessive at either end of the range. As the upper and lower temperature limits are approached the slopes of the gradient lines become almost constant. These are the important facts which make possible such a high percentage of heat transfer in the supercritical region from the lower to the higher pressure.

On the other hand, if an analysis is made using the critical pressure line and the 3500 p.s.i.a. line, for example, and starting at the right hand end of the chart with the same end temperature difference as would be obtained with the previous example, the slope of the temperature gradient lines will increase more rapidly as the reference line is approached and it will be found that a temperature gradient reversal occurs which obviously will stop the heat exchange in the region of maximum $\Delta h$, and the total heat exchange in a given regenerator will be only a fraction of that which is possible with supercritical pressures. If even lower pressures are used, bringing the process into the saturation zone indicated in the left hand portion of FIG. 4, the possibility of any substantial amount of heat exchange decreases rapidly.

Of the two aspects of the enthalpy-temperature relations, namely the existence of a maximum $\Delta h$ between the constant pressure lines relation, and the increasing temperature increment with constant enthalpy increment, the former is a detriment to cycle efficiency and the latter is an aid in reducing regenerator size. The former is an index of the unavailability of heat energy for conversion to work. As such, it leads to an alternate but equivalent definition of the thermal efficiency of the cycle.

$$\eta_t = \frac{\text{total work output} - \text{pump work input}}{\text{total work output} + \Delta h_{\max}}$$

From this relation it is evident that $\eta_t$ can be increased by reducing $\Delta h_{\max}$.

If $\Delta h$ for another set of pressures, say 4500 p.s.i.a. and 5500 p.s.i.a. is plotted (see FIG. 5) a lower maximum $\Delta h$ is evident. It can be shown that as the pressure level (above the critical pressure) is increased and as the pressure ratio is decreased, the maximum $\Delta h$ is decreased.

The working fluid may consist of any pure substance or mixture of pure substances which are suitable for use with each other, provided that the fluid can be transformed between liquid and gaseous states at critical temperatures and pressures which are attainable with the available equipment and environment. For use in an earth environment it is desirable that the critical temperature should be above ambient air temperature at least on a cool day or above the temperature of large bodies of water. The critical pressure should be low enough so that the maximum pressures will be within the limits of strength of modern engineering materials. Water and carbon dioxide are two such materials which also have the virtues of being cheap, easy to handle, non toxic, and available in large quantities.

Water has a critical temperature of 705.4 degrees Fahrenheit and a critical pressure of 3206.2 pounds per square inch absolute. Thus it can be conveniently operated in the new cycle in earth environment from low temperature of the order of 35 to 120 degrees Fahrenheit to high temperatures of the order of 1400 to 2000 degrees Fahrenheit, and from low cycle pressures of the order of 3500 to 5500 pounds per square inch absolute to high cycle pressures of the order of 4500 to 10,000 pounds per square inch absolute.

Carbon dioxide has a critical temperature of 87.7 degrees Fahrenheit and a critical pressure of 1072 pounds per sqare inch absolute. It can be conveniently operated in the new cycle in earth environment from low temperatures of the order of 35 to 75 degrees Fahrenheit to high temperatures of the order of 1400 to 2000 degrees Fahrenheit, and from low cycle pressures of the order of 1500 to 5500 pounds per square inch absolute to high cycle pressures of the order of 3000 to 10,000 pounds per square inch absolute.

The above ranges are the presently most preferred ones but the invention is not so limited. The low cycle pressure for water may be as low as 3300 pounds and for carbon dioxide about 1100 pounds. These values technically avoid the difficulties mentioned above but a greater margin is desirable. For various installations it will be desirable to use low cycle pressure ranging from about ten percent to about three hundred percent above the critical pressure and high cycle pressures ranging from about fifteen percent to about one thousand percent above the low cycle pressures. Actually the high pressure and temperature ranges are dependent primarily on the quality of materials which may be available now and in the future, and on the dissociation temperatures of the fluids.

In some circumstances greater economy may be realized by using refrigerant coolants to further reduce the low temperatures of the fluids. It is contemplated that engines using the new cycle will be used in various phases of space exploration and in that event it will be economically possible to use extremely low temperatures because of the cold environment.

It will be apparent to those skilled in the art that various changes and modifications may be made without departing from the spirit of the invention and it is intended that all such changes and modifications shall be embraced within the scope of the following claims.

I claim:

1. A heat engine comprising a circulating system containing a working fluid, the system including: pressurizing means to raise the pressure of said fluid in liquid phase from a low cycle pressure to a high pressure; means to add heat to said fluid substantially at said high cycle pressure to raise it to its high cycle temperature substantially above its critical temperature; means to expand said fluid through an energy converter to do useful work; and means to cool said fluid substantially at said low cycle pressure to a temperature substantially below its critical temperature to render it completely liquid for entrainment by said pressurizing means; the low cycle pressure in said system being substantially above the critical pressure of said fluid.

2. A heat engine as claimed in claim 1; and, in addition thereto, regenerator means included in said system for transferring heat from the low pressure fluid exhausted by said energy converter to the high pressure fluid supplied by said pressurizing means.

3. A heat engine comprising a circulating system containing a working fluid, the system including: a pump for pumping the fluid in liquid phase from a low supercritical pressure to a high supercritical pressure; a heat receiving portion of a regenerator; means to conduct said liquefied fluid to said regenerator, the latter serving to add heat to said fluid; means to supply additional heat to said fluid to raise it to a desired working temperature substantially above its critical temperature; one of the heating means serving to transform the fluid from liquid to gaseous phase; an energy converter to expand said fluid to its low supercritical pressure and extract work therefrom; a heat transmitting portion of a regenerator; means to conduct said expanded fluid to the heat transmitting portion of said regenerator and pass it therethrough at low supercritical pressure; and means between said regenerator and said pump to reduce said fluid to a temperature substantially below its critical temperature and return it to said pump; one of the cooling means serving to transform the fluid from gaseous to liquid phase; the pressure of said working fluid being above its critical pressure in all parts of the system during operation.

4. A method of operating a heat engine provided with a working fluid, comprising: supplying said fluid in liquid phase at a low cycle temperature substantially below its critical temperature; raising the pressure of said fluid in its liquid phase from its low cycle pressure to its high cycle pressure; adding heat to said fluid at substantially its high cycle pressure to raise said fluid to its high cycle temperature substantially above its critical temperature; expanding said fluid in an energy converter to do useful work and reduce its pressure to the low cycle pressure; and cooling said fluid substantially at its low cycle pressure down to its low cycle temperature and liquefying it; the low cycle pressure being substantially above the critical pressure of the fluid; and the pressure of the fluid being substantially at or above low cycle pressure at all times during operation.

5. A method of operating a heat engine as claimed in claim 4 including regeneratively transferring a major portion of the heat contained in the exhaust fluid to the pressurized fluid at supercritical pressure during the cooling process.

6. A method of operating a heat engine as claimed in claim 4 in which the low cycle pressure is from about ten percent to about three hundred percent above the critical pressure of the fluid.

7. A method of operating a heat engine as claimed in claim 4 in which the high cycle pressure is from about fifteen percent to about one thousand percent above the low cycle pressure.

8. A method of transferring heat from a hot low pressure exhaust fluid to a cooler high pressure supply fluid comprising: passing said fluids through a heat exchanger in heat exchanging relation to each other; and maintaining the pressures of both fluids above their critical pressure.

9. A method of operating a heat engine provided with a circulating system containing carbon dioxide as a working fluid; comprising: pumping said fluid at a temperature substantially below 87 degrees Fahrenheit from a low cycle pressure of not less than about 1100 pounds per square inch absolute to a considerably higher pressure; adding heat to said fluid substantially at said higher pressure to raise its temperature substantially above 87 degrees Fahrenheit; expanding said fluid in an energy converter to do useful work; and cooling said fluid substantially at said low cycle pressure back to its original temperature at the beginning of the cycle; the pressure of the fluid being maintained at or above said low cycle pressure in all parts of the system during operation.

10. A method of operating a heat engine as claimed in claim 9; the low temperature of said fluid being of the order of 35 to 75 degrees Fahrenheit.

11. A method of operating a heat engine as claimed in claim 9; the low cycle pressure of said fluid being of the order of 1500 to 5500 pounds per square inch absolute.

12. A method of operating a heat engine as claimed in claim 9; the high temperature of said fluid being of the order of 1400 to 2000 degrees Fahrenheit.

13. A method of operating a heat engine as claimed in claim 9; the high cycle pressure of said fluid being of the order of 3000 to 10,000 pounds per square inch absolute.

14. A method of operating a heat engine provided with a circulating system containing water as a working fluid comprising: pumping said fluid at a temperature substantially below 700 degrees Fahrenheit from a low cycle pressure of not less than about 3300 pounds per square inch absolute to a considerably higher pressure; adding heat to said fluid substantially at said higher pressure to raise its temperature substantially above 700 degrees Fahrenheit; expanding said fluid in an energy converter to do useful work; and cooling said fluid substantially at said low cycle pressure back to its original temperature at the beginning of said cycle; the pressure of the fluid being maintained at or above said low cycle pressure in all parts of the system during operation.

15. A method of operating a heat engine as claimed in claim 14; the low temperature of said fluid being of the order of 35 to 120 degrees Fahrenheit.

16. A method of operating a heat engine as claimed in claim 14; the low cycle pressure of said fluid being of the order of 3500 to 5500 pounds per square inch absolute.

17. A method of operating a heat engine as claimed in claim 14; the high temperature of said fluid being of the order of 1400 to 2000 degrees Fahrenheit.

18. A method of operating a heat engine as claimed in claim 14; the high cycle pressure of said fluid being of the order of 4500 to 10,000 pounds per square inch absolute.

References Cited by the Examiner

UNITED STATES PATENTS

| | | | |
|---|---|---|---|
| 1,032,236 | 7/1912 | Patten | 60—36 |
| 2,303,159 | 11/1942 | Cross et al. | 60—64 |
| 2,471,476 | 5/1949 | Benning et al. | 60—36 |
| 3,040,528 | 6/1962 | Tabor et al. | 60—36 |

SAMUEL LEVINE, *Primary Examiner.*

ROBERT R. BUNEVICH, *Examiner.*